United States Patent [19]
Kaganoi

[11] Patent Number: 5,854,783
[45] Date of Patent: Dec. 29, 1998

[54] CELL INTERVAL DETERMINATION APPARATUS FOR USAGE PARAMETER CONTROL

[75] Inventor: Teruo Kaganoi, Tokyo, Japan

[73] Assignee: NEC Corporation, Tokyo, Japan

[21] Appl. No.: 674,759

[22] Filed: Jul. 2, 1996

[30] Foreign Application Priority Data

Jul. 10, 1995 [JP] Japan .................................. 7-198009

[51] Int. Cl.⁶ .............................. H04J 3/14; H04L 12/56
[52] U.S. Cl. ........................................... 370/232; 370/253
[58] Field of Search .................................. 370/229, 230, 370/231, 232, 233, 234, 235, 236, 252, 253, 395, 397, 399, 409

[56] References Cited

U.S. PATENT DOCUMENTS

| | | | |
|---|---|---|---|
| 5,432,713 | 7/1995 | Takeo et al. | 395/766 |
| 5,566,163 | 10/1996 | Petit | 370/230 |
| 5,581,546 | 12/1996 | Roosma et al. | 370/253 |
| 5,623,405 | 4/1997 | Isono | 395/230 |

FOREIGN PATENT DOCUMENTS

| | | |
|---|---|---|
| 5136806 | 6/1993 | Japan . |
| 5136808 | 6/1993 | Japan . |
| 5-268239 | 10/1993 | Japan . |

*Primary Examiner*—Alpus H. Hsu
*Assistant Examiner*—Kwang B. Yao
*Attorney, Agent, or Firm*—Sughrue, Mion, Zinn, Macpeak & Seas, PLLC

[57] ABSTRACT

A cell interval determination apparatus for usage parameter control, includes a counter, a memory, a cell arrival interval check unit, and a control unit. The counter is incremented every time a cell has arrived in an asynchronous mode to represent a cell arrival time. The memory stores, in units of cell type information, cell information consisting of cell type information included in the cell, the cell arrival time counted by the counter, a cell arrival interval defined value which is set in units of cell type information, and flag information representing a retrieval target/non-retrieval target. The cell arrival interval check unit calculates a time difference between the cell arrival time stored in the memory and the cell arrival time represented by the counter and determines a cell which violates the cell arrival interval defined value stored in the memory. The control unit retrieves, from the memory in accordance with the flag information, cell information having the same cell type information as that extracted from the arriving cell, designates to start the cell arrival interval check unit in accordance with a retrieval result, and stores the cell information associated with the arriving cell in the memory in accordance with the retrieval result and a determination result of the cell arrival interval check unit.

7 Claims, 4 Drawing Sheets

| ADDRESS | CELL TYPE INFORMATION VP/VC | ARRIVAL TIME ta-cnt | FLAG FG | CELL ARRIVAL INTERVAL DEFINED VALUE T |
|---|---|---|---|---|
| 0 | aaaaaaa | AAAAAAA | 0 | aAaAaAaA |
| 1 | bbbbbbb | BBBBBBB | 1 | bBbBbBbB |
| 2 | ccccccc | CCCCCCC | 1 | cCcCcCcC |
| ... | ... | ... | ... | ... |
| adr1 | ddddddd | DDDDDDD | 0→1 | dDdDdDdD |
| ... | ... | ... | ... | ... |
| adr2 | eeeeeee | EEEEEEE | 0 | eEeEeEeE |
| ... | ... | ... | ... | ... |
| n | zzzzzzz | ZZZZZZZ | 0 | zZzZzZzZ |

F I G. 2

CELL INTERVAL DETERMINATION APPARATUS FOR USAGE PARAMETER CONTROL

BACKGROUND OF THE INVENTION

The present invention relates to a cell interval determination apparatus for UPC (Usage Parameter Control) and, more particularly, to a cell interval determination apparatus for UPC, which controls the cell flow by counting the number of cells arriving during a defined cycle.

Conventionally, in an ATM (Asynchronous Transfer Mode) wherein a cell as one of fixed-length packets is transferred in an asynchronous mode, cell flow control is performed by UPC on the basis of a defined cycle (defined number of cells), i.e., the traffic declaration value of a subscriber. In cell flow control by UPC, cells which are input in violation of the declaration value are discarded to prevent a degradation in information transfer quality of the entire network.

FIG. 4 shows a conventional cell arrival interval determination circuit used for UPC. Referring to FIG. 4, the cell arrival interval determination circuit comprises a timer 41 for counting a present time t, a memory unit 42 for storing a starting time tb of a regulated cycle T in units of cell kind information VP (Virtual Path)/VC (Virtual Channel), a regulated cycle generation means 43 for generating the regulated cycle T, and a time difference determination unit 44 for determining on the basis of received cell kind information VP/VC whether a time difference Dt between the present time t counted by the timer 41 and the starting time tb associated with the cell kind in the memory unit 42 is over the regulated cycle T for the cell kind. Such a cell arrival interval determination circuit is disclosed in, e.g., Japanese Patent Laid-Open No. 5-268239.

The operation of the above-mentioned cell arrival interval determination circuit will be described below. The starting time tb of the regulated cycle T is stored in advance in the memory unit 42 in units of cell kind information VP/VC. The timer 41 counts the present time t. The time difference determination unit 44 determines on the basis of the received cell kind information VP/VC whether the time difference Dt between the present time t counted by the timer 41 and the starting time tb for the cell kind in the memory unit 42 is over the regulated cycle T of the cell kind. If the time difference Dt is smaller than the regulated cycle T for the cell kind, the cell control unit is designated to discard or mark the cell to control the cell flow.

In the conventional cell arrival interval determination circuit above, the time measurable by the timer (countable time) is limited. Therefore, when a cell has arrived when the countable time has elapsed, the time difference Dt between the starting time tb and the present time t represented by the timer cannot be obtained. That is, the cell flow cannot be controlled.

Hence, assuming that the cell arrival interval becomes very large, the countable time of the timer must be set in correspondence with the conceivable maximum arrival interval. More specifically, a large-scale timer capable of counting a longer time must be prepared. This increases the circuit scale of the cell arrival interval determination circuit, resulting in a difficulty in realizing this circuit. Even when the countable time of the timer is set to be longer, only a limited value can be counted, and determination of the cell arrival interval may be disabled.

SUMMARY OF THE INVENTION

It is an object of the present invention to provide a cell interval determination circuit for UPC, which can easily determine whether the arrival interval violates the defined value of cell arrival interval even when the actual cell arrival interval becomes very large.

It is another object of the present invention to provide a cell interval determination apparatus capable of easily reducing the circuit scale by omitting a large-scale timer capable of counting a long time.

In order to achieve the above objects, according to the present invention, there is provided a cell interval determination apparatus for usage parameter control, comprising count means which is incremented every time a cell has arrived in an asynchronous mode to represent a cell arrival time, memory means for storing, in units of cell type information, cell information consisting of cell type information included in the cell, the cell arrival time counted by the count means, a cell arrival interval defined value which is set in units of cell type information, and flag information representing a retrieval target/non-retrieval target, cell arrival interval check means for calculating a time difference between the cell arrival time stored in the memory means and the cell arrival time represented by the count means and determining a cell which violates the cell arrival interval defined value stored in the memory means, and control means for retrieving, from the memory means in accordance with the flag information, cell information having the same cell type information as that extracted from the arriving cell, designating to start the cell arrival interval check means in accordance with a retrieval result, and storing the cell information associated with the arriving cell in the memory means in accordance with the retrieval result and a determination result of the cell arrival interval check means.

BRIEF DESCRIPTION OF THE DRAWINGS

FIG. 2 is a view showing the structure of information stored in an associative memory shown in FIG. 1;

DESCRIPTION OF THE PREFERRED EMBODIMENT

Figure 1:
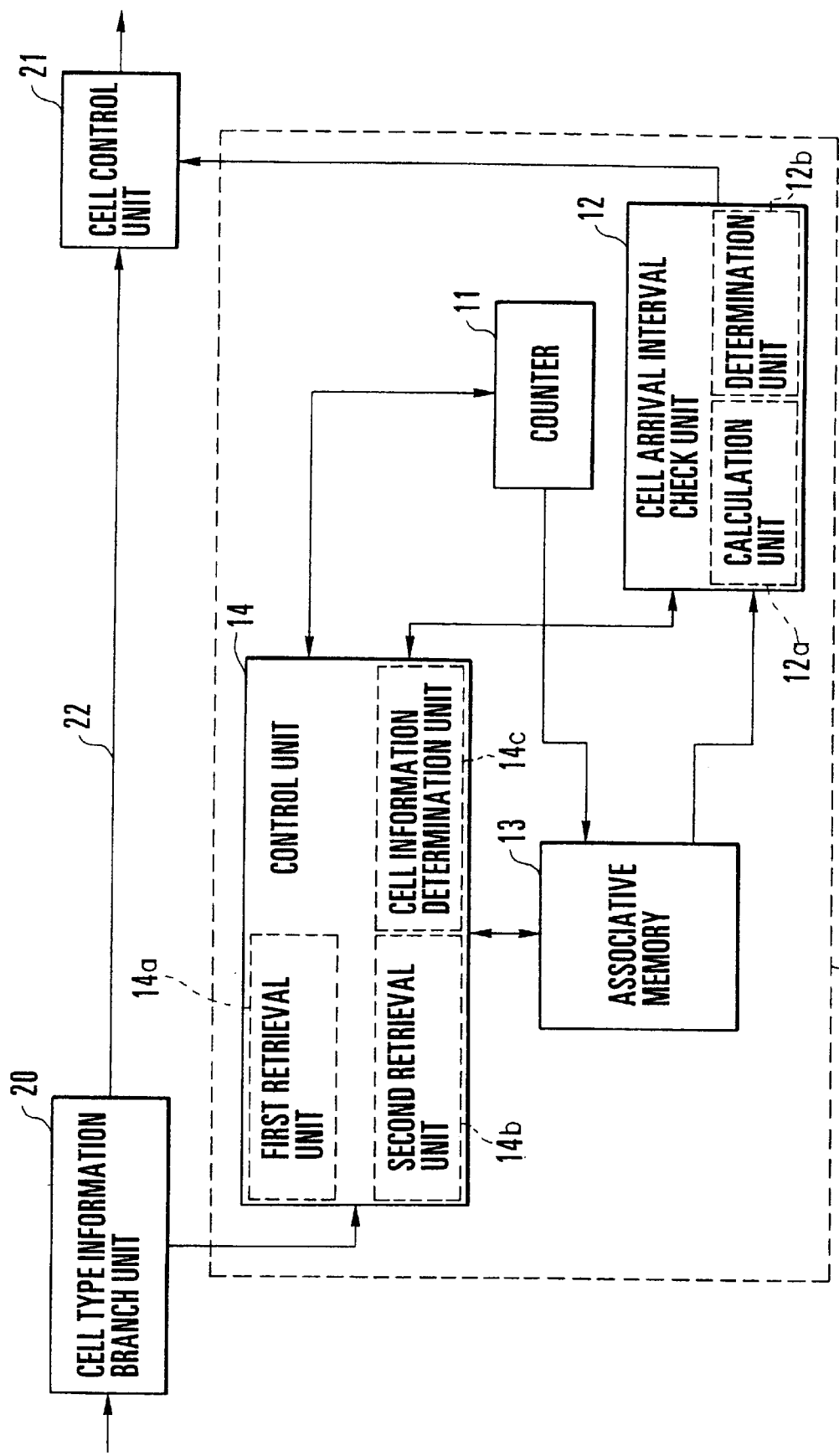
FIG. 1 is a block diagram showing the arrangement of a cell interval determination circuit according to an embodiment of the present invention.

An embodiment of the present invention will be described below with reference to the accompanying drawings. FIG. 1 shows the arrangement of a cell interval determination circuit for UPC according to the first embodiment of the present invention. Referring to FIG. 1, a cell interval determination circuit 10 comprises a counter 11 representing a cell arrival time, a cell arrival interval check unit 12 for checking the cell arrival interval, an associative memory 13 for storing various information to be described later, and a control unit 14 for controlling the operation of the cell interval determination circuit.

The cell arrival interval check unit 12 comprises a calculation unit 12a for calculating the time difference between cell arrival times, and a determination unit 12b for determining a violative cell on the basis of the time difference calculated by the calculation unit 12a and a value stored in the associative memory 13. The control unit 14 comprises a first retrieval unit 14a for retrieving data from the associative memory 13 on the basis of cell type information extracted from the arriving cell, and a second retrieval means 14b for retrieving data from the associative memory 13 on the basis of the cell arrival time represented by the count value of the counter 11, and a cell information control unit 14c for writing cell information associated with the arriving cell in the associative memory 13 in accordance with the cell type information.

Cell type information VP/VC included in an input cell is branched by a cell type information branch unit 20 on a highway 22 and input to the control unit 14 of the cell interval determination circuit 10. A cell on the highway 22 is discarded or marked by a cell control unit 21 on the basis of the check result of the cell arrival interval check unit 12.

The maximum count value of the counter 11 is set to be equal to or slightly larger than the maximum value of the cell arrival interval defined value (defined cycle) which is set in units of cell type information VP/VC. In this embodiment, the countable time of the counter need not be set very large on the assumption that the actual cell arrival interval becomes very large, unlike in the prior art.

The counter 11 is incremented by "1" for one cell time (cell arrival time). When the count value exceeds the maximum count value, the counter 11 is reset to the initial value to repeat the count operation.

The cell arrival interval check unit 12 determines the cell arrival interval when the same cell type information VP/VC has arrived twice or more before the counter 11 representing the cell arrival time completes the count operation of one cycle (from the initial value to the maximum count value).

FIG. 2 shows the data structure of contents stored in the associative memory 13. As shown in FIG. 2, four pieces of information, i.e., the cell type information VP/VC, an actual cell arrival time ta_cnt having the cell type information VP/VC, a flag FG representing whether data registered in each word is set as a retrieval target, and a cell arrival interval defined value T of the cell type information VP/VC are stored at each address. More specifically, the four pieces of information, i.e., the cell type information VP/VC, the arrival time ta_cnt, the flag FG, and the cell arrival interval defined value T are stored as one word.

The flag FG of "0" represents that the word is a retrieval target, and the flag FG of "1" represents that the word is a non-retrieval target.

Cells arrive at the cell interval determination circuit 10 one by one, and cell interval determination processing is completed within one cell, time (time until the next cell arrives). Since the cell type information VP/VC is written in the associative memory 13 only once, the number of words in the associative memory 13 corresponds to the number of pieces of cell type information VP/VC.

Figure 3:
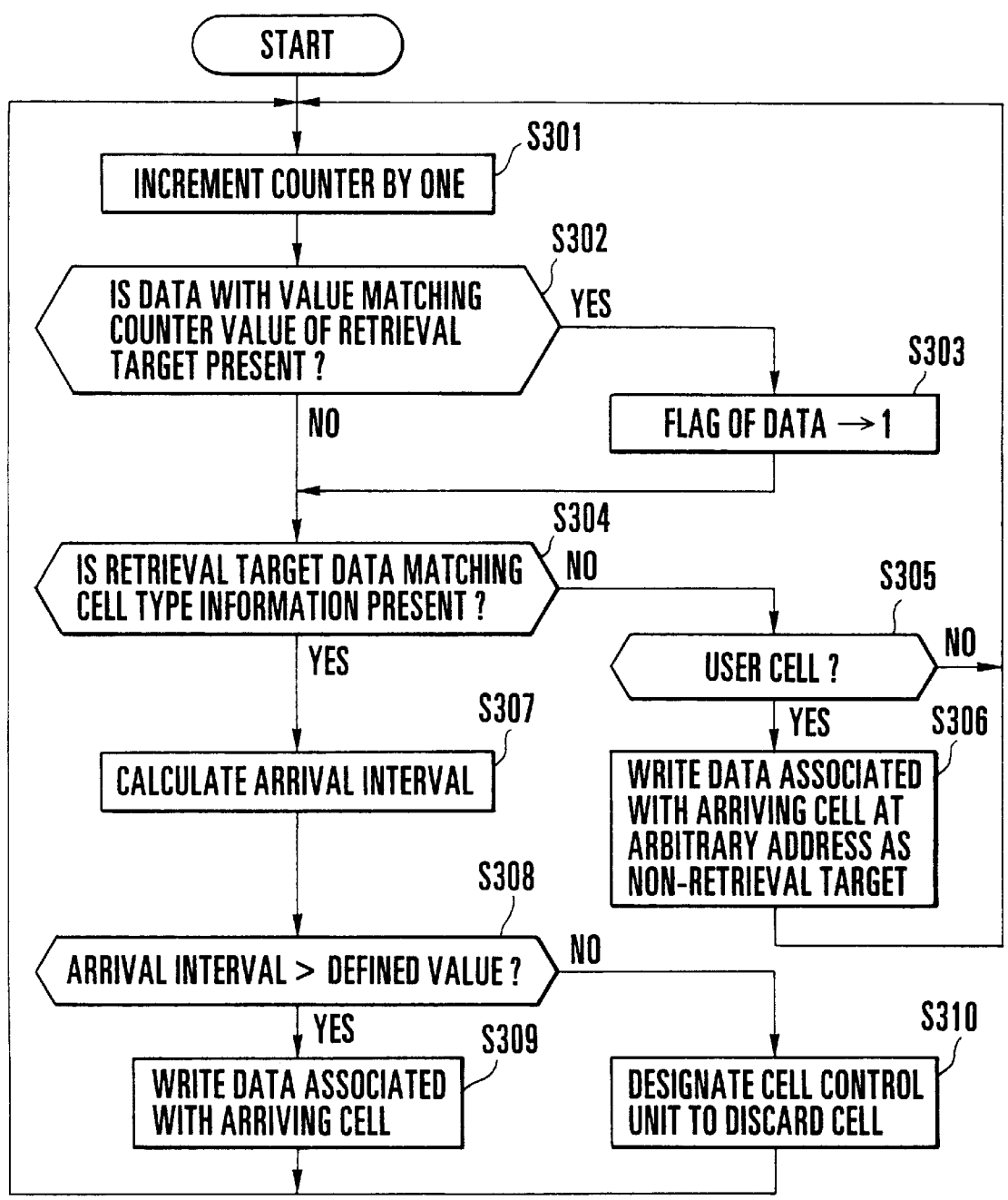
FIG. 3 is a flow chart for explaining the operation of the cell interval determination circuit shown in FIG. 1.
Figure 4:
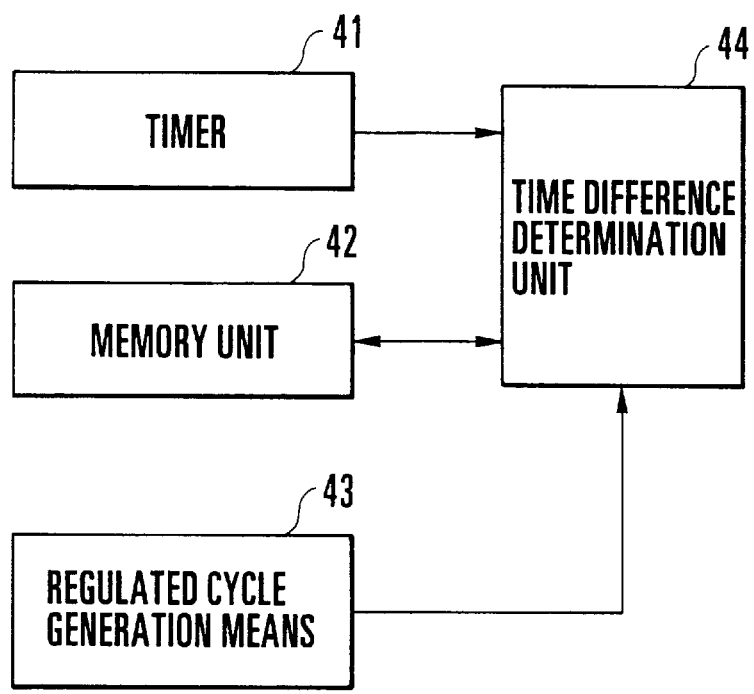
FIG. 4 is a block diagram showing a conventional cell interval determination circuit.

The operation of the cell interval determination circuit 10 of this embodiment having the above arrangement will be described below with reference to the flow chart of FIG. 3.

The counter 11 is incremented by one for one cell time, i.e., every time a cell has arrived (step S301). When the counter 11 is incremented by one, the second retrieval unit 14b of the control unit 14 checks whether retrieval target data with a value matching the value of the counter 11 is present in all word data stored in the associative memory 13 (step S302). More specifically, it is checked whether data having the arrival time ta_cnt of the same value (value before the counter 11 completes the count operation of one cycle) as that of the cell arrival time of the counter 11 is present in retrieval target data with the flag FG of "0".

If YES in step S302, the control unit 14 determines that an interval larger than the maximum cell arrival interval is generated, and inverts the value of the flag FG of the data from "0" to "1" to set the data as a non-retrieval target (step S303). For example, in FIG. 2, data having the arrival time ta_cnt with the same value as that of the cell arrival time of the counter 11 is present at address adrl, and the flag FG of the data at address adrl is inverted from "0" to "1". If NO in step S302, the flag FG is not changed.

The control unit 14 determines whether a cell has arrived when the value of the counter 11 is incremented by one. If a cell has arrived, the first retrieval unit 14a of the control unit 14 checks whether data having the cell type information VP/VC with a value matching that of the cell type information VP/VC of the arriving cell is present in retrieval target data with the flag FG of "0" in the associative memory 13 (step S304).

If NO in step S304, the control unit 14 determines whether the arriving cell is a user cell (step S305). If the arriving cell is not a user cell but an idle cell, the flow returns to step S301. If YES in step S305, the cell information control unit 14c of the control unit 14 writes the value of the cell type information VP/VC of the arriving cell, the value of the counter 11, and the cell arrival interval defined value T of the cell at an unused address as a non-retrieval target (flag FG=37 1") in the associative memory 13, and at the same time, sets a value of "0" in the flag FG of the address, which represents that the data is a retrieval target (step S306).

If YES in step S304, this means that the counter 11 for measuring the maximum cell arrival interval has not completed the count operation of one cycle yet after a cell having the cell type information VP/VC arrives, so the cell arrival interval defined value may not be satisfied.

The calculation unit 12a of the cell arrival interval check unit 12 calculates the difference (arrival interval) between the arrival time of the newly arriving cell and that of the preceding cell (step S307). More specifically, the difference between the value of the counter 11 and the value of the arrival time ta_cnt at a corresponding address in the associative memory 13 is calculated to obtain the arrival interval.

The determination unit 12b determines whether the calculated arrival interval value is larger than the cell arrival interval defined value T in the associative memory 13 (step S308). If YES in step S308, the cell arrival interval defined value T is satisfied. Therefore, the cell information control unit 14c of the control unit 14 updates the cell type information VP/VC of the arriving cell, the value of the counter 11, and the cell arrival interval defined value T, and writes the information at an address with the matching cell type information VP/VC in the associative memory 13 (step S309). At this time, the value of the flag FG of the address having the matching cell type information VP/VC in the associative memory 13 is not changed, so that the retrieval target is kept set.

If NO in step S308, the determination unit 12b determines that the arrival time value violates the cell arrival interval defined value T. The cell arrival interval check unit 12 designates the cell control unit 21 to discard the cell (step S310).

With the above operation, when the maximum value of the cell arrival interval defined value is exceeded, the counter 11 completes the count operation of one cycle. Therefore, even when the cell arrival interval increases beyond the maximum value, the corresponding cell type information VP/VC is set at a non-retrieval target. The cell arrival interval check unit 12 need not determine whether the cell arrival interval satisfies the defined value.

A preferred embodiment of the present invention has been described above, though the present invention is not limited to the above embodiment.

As has been described above, according to the cell interval determination circuit of the present invention, the maximum count value of the count means is set to be equal to or slightly larger than the maximum value of the cell arrival interval defined value which is set in units of cell type information. Only with this arrangement, even when the actual cell arrival interval becomes very large, it can be easily determined that the arrival interval does not violate the cell arrival interval defined value as far as the count means has completed the count operation of one cycle after arrival of a cell. Therefore, the maximum count value of the count means for detecting the cell arrival interval can be set to be equal to or slightly larger than the maximum value of the cell arrival interval defined value which is a limited value set in units of cell type information. Therefore, unlike the prior art, a large-scale timer capable of counting a long time can be omitted, so that an effect of easily reducing the circuit scale can be obtained.

What is claimed is:

1. A cell interval determination apparatus for usage parameter control, comprising:

count means which is incremented every time a cell has arrived in an asynchronous mode to represent a cell arrival time;

memory means for storing, in units of cell type information, cell information consisting of cell type information included in the cell, the cell arrival time counted by said count means, a cell arrival interval defined value which is set in units of cell type information, and flag information representing a retrieval target/non-retrieval target;

cell arrival interval check means for calculating a time difference between the cell arrival time stored in said memory means and the cell arrival time represented by said count means and determining a cell which violates the cell arrival interval defined value stored in said memory means; and control means for retrieving, from said memory means in accordance with the flag information, cell information having the same cell type information as that extracted from the arriving cell, designating to start said cell arrival interval check means in accordance with a retrieval result, and storing the cell information associated with the arriving cell in said memory means in accordance with the retrieval result and a determination result of said cell arrival interval check means.

2. An apparatus according to claim 1, wherein said control means comprises first retrieval means for retrieving, from said memory means in accordance with the flag information, the cell information having the same cell type information as that extracted from the arriving cell, and cell information control means for storing the cell information associated with the arriving cell at a free address of said memory means when the cell information as the retrieval target for said first retrieval means is not stored, and updating the cell information associated with the arriving cell and storing the cell information in said memory means when the cell information as the retrieval target for said first retrieval means is stored and said started cell arrival interval check means determines that the arriving cell is not violative.

3. An apparatus according to claim 2, wherein said control means comprises second retrieval means for retrieving, from said memory means in accordance with the flag information, cell information having the same arrival time as the cell arrival time represented by said count means every time a cell has arrived, said cell information control means sets the flag information of the cell information retrieved by said second retrieval means as the non-retrieval target, and said first retrieval means retrieves cell information having the same identification information in accordance with the flag information representing the retrieval target every time a user cell has arrived.

4. An apparatus according to claim 2, wherein said cell information control means sets the flag information to represent the retrieval target and stores the cell information associated with the arriving cell in said memory means when the cell information as the retrieval target for said first retrieval means is not stored in said memory means and when said cell arrival interval check means determines that the arriving cell is not violative.

5. An apparatus according to claim 1, wherein a maximum count value of said count means is set to be equal to a maximum value of the cell arrival interval defined value or slightly larger than the maximum value of the cell arrival interval defined value, which is set in units of cell type information.

6. An apparatus according to claim 1, wherein said cell arrival interval check means comprises calculation means for calculating the time difference between the cell arrival time stored in said memory means and the cell arrival time represented by said count means, and determination means for comparing the time difference calculated by said calculation means with the cell arrival interval defined value stored in said memory means to determine a violative cell.

7. An apparatus according to claim 1, wherein said cell arrival interval check means designates to discard a cell determined as violative.

\* \* \* \* \*

UNITED STATES PATENT AND TRADEMARK OFFICE
CERTIFICATE OF CORRECTION

PATENT NO. : 5,854, 783
DATED : December 29, 1998
INVENTOR(S) : Teruo Kaganoi

It is certified that error appears in the above-indentified patent and that said Letters Patent is hereby corrected as shown below:

Column 3, line 33, delete "to ent" and insert --ta_cnt--.

Column 4, line 24, delete "(flag FG = 37 1")" and insert --(flag FG = "1")--.

Signed and Sealed this

Nineteenth Day of October, 1999

Attest:

Attesting Officer

Q. TODD DICKINSON

Acting Commissioner of Patents and Trademarks